(12) United States Patent
Rolla (10) Patent No.: US 7,258,403 B2
(45) Date of Patent: Aug. 21, 2007

(54) DEMOUNTABLE TIRE RIM WITH A SPARE INNER WHEEL AND TIRE FOR SAID TIRE RIM

(76) Inventor: José Santiago Rolla, Perón 1219 - piso 3°"14", Buenos Aires (AR) (1038)

( * ) Notice: Subject to any disclaimer, the term of this patent is extended or adjusted under 35 U.S.C. 154(b) by 0 days.

(21) Appl. No.: 10/751,707

(22) Filed: Jan. 5, 2004

(65) Prior Publication Data

US 2005/0067079 A1    Mar. 31, 2005

(51) Int. Cl.
*B60B 25/00* (2006.01)
*B60B 23/00* (2006.01)
*B60C 17/02* (2006.01)
*B60C 7/24* (2006.01)

(52) U.S. Cl. .................. 301/95.11; 301/9.1; 152/520; 152/412

(58) Field of Classification Search ............... 152/516, 152/520, 384, 396, 412–413, 409–410, DIG. 10; 301/9.1, 95.11, 64.301, 64.303
See application file for complete search history.

(56) References Cited

U.S. PATENT DOCUMENTS

| | | | | |
|---|---|---|---|---|
| 906,404 A | * | 12/1908 | Foucart | 301/29.2 |
| 1,433,279 A | * | 10/1922 | Howell | 301/29.2 |
| 2,105,317 A | | 1/1938 | Frank | |
| 2,496,256 A | * | 2/1950 | Babin | 152/412 |
| 2,566,663 A | * | 9/1951 | Hollerith | 301/6.7 |
| 2,990,869 A | * | 7/1961 | Riley | 152/339.1 |
| 3,037,815 A | | 6/1962 | Hibbard | |
| 3,130,965 A | * | 4/1964 | Niclas | 267/64.27 |
| 4,015,652 A | * | 4/1977 | Harris | 152/379.3 |
| 4,363,347 A | * | 12/1982 | Baumgartner | 152/411 |
| 4,424,842 A | * | 1/1984 | Trebaol | 152/158 |
| 4,481,997 A | * | 11/1984 | Strader | 152/401 |
| 4,573,509 A | * | 3/1986 | Smith et al. | 152/158 |
| 4,989,657 A | | 2/1991 | Lipper | |
| 5,000,241 A | * | 3/1991 | Patecell | 152/382 |
| 5,022,450 A | | 6/1991 | Weeks | |
| 6,186,206 B1 | * | 2/2001 | Yamagiwa et al. | 152/520 |
| 6,637,486 B1 | * | 10/2003 | Rolla | 152/381.6 |
| 6,814,114 B2 | * | 11/2004 | Bouvier et al. | 152/158 |

\* cited by examiner

*Primary Examiner*—Jason R. Bellinger
(74) *Attorney, Agent, or Firm*—Paul L. Brown; Amin Hallihan LLC

(57) ABSTRACT

The present invention is related to a demountable tire rim assembly having a spare inner wheel which permits running during the run flat condition. The demountable tire rim includes two complementary annular parts provided with reciprocal threaded coupling members on the perimeter of the annular parts which include threaded and non-threaded sectors which are structurally arranged to secure the annular parts together.

19 Claims, 9 Drawing Sheets

DEMOUNTABLE TIRE RIM WITH A SPARE INNER WHEEL AND TIRE FOR SAID TIRE RIM

I—BACKGROUND OF THE INVENTION

1. Field of Invention

The present invention relates to a tire rim assembly which allows a vehicle to run with a flat tire. More particularly, the present invention relates to a demountable tire rim assembly with a spare inner wheel and having two annular parts which support the spare inner wheel and permit engagement of the spare inner wheel with the ground during the run flat condition.

2. Description of Prior Art

Within the prior art, there is U.S. Pat. No. 2,105,317 which discloses an aircraft wheel made of two pieces. However, this tire rim is not used in automobiles and in addition, it is not prepared to mount a spare inner wheel.

U.S. Pat. No. 3,037,815 shows a wheel in which the tire rim has a thread to vary the tread. This wheel is intended to be used in tractors and lacks a spare inner wheel.

U.S. Pat. No. 4,989,657 is a modular wheel consisting of two main pieces and a third piece to ensure the tire grip. These pieces are joined by means of bolts but they lack other coupling means. Such a structure is not adapted for the assembly of a spare inner wheel.

U.S. Pat. No. 5,022,450 discloses a set of safety tire rim and demountable wheel. Both parts of the tire rim are joined by means of bolts and lack other coupling means. There is an insert to run with the flat tire which is simply added but does not determine the tire rim structure.

None of these prior art tire rim assemblies are prepared to have a spare wheel and at the same time, be demountable with a threaded or bayonet type coupling means.

II—SUMMARY OF THE INVENTION

The present demountable tire rim assembly having a spare inner wheel includes two complementary annular parts provided with threaded reciprocal coupling members. Both complementary annular parts form side holding rims for the tire beads and in the central part of the annular parts, they provide support for the spare inner wheel.

Objects and Advantages

An advantage of the present tire rim assembly is that it provides a structure to mount and easily remove the spare inner wheel.

Another advantage is that the present invention simplifies the placement and removal of tubeless tires from the tire assembly because there is no need of using levers, as usually occurs with one-piece tire rims. This is very significant in low profile tires, which due to the height of their lateral walls, are less flexible making manipulation in conventional tire rims difficult.

A further advantage of the present tire rim assembly is that it is provided with an annular depression to receive the spare inner wheel which allows to run with tubeless tires without deteriorating. All the well-known prior art systems, although having their contact surfaces lubricated, do not have an annular depression for the spare wheel to be rotated or float relative to the tire rim. Therefore, contact between the spare inner wheel and the tire causes the tire to deteriorate because the difference in diameters causes a destructive attrition between the tire and spare inner wheel.

In addition, the present tire rim assembly is compatible with different antifriction means such as rollers at the base of the inner wheel or bushings or anti-friction coatings between the tire assembly and the inner wheel. All this, on the one hand, facilitates the relative sliding between the inner wheel and the tire assembly, and on the other hand, contact between the inner wheel and the tire, thus avoiding deterioration of the tire.

The present tire rim assembly is compatible with the use of inner wheels made of different materials, namely plastic, thermoplastic, elastomer, flexible, semiflexible, semirigid or rigid. The use of these materials and the chance of incorporating easer holes allow the inner wheel to be resistant and at the same time, light and safe.

The present tire rim assembly is also compatible with the use of spare inner wheels, either one-piece or, for instance, consisting of three or more sectors connected to one another through flexible and strong bonding elements, which allow them to behave like one-piece wheels and allow them to be warped, lessening their major diameter so as to be placed and removed from the inside of the tire which inner mouth has a shorter diameter.

Yet a further advantage of the present tire rim assembly is high safety. This is due to the fact that the assembly is provided with complement threaded or bayonet type reciprocal coupling means with a plurality of connection passages wherein bolts with nut, lockpins, annular groove with cross section washer, etc. are provided.

Still further advantage is that the present tire rim assembly allows to form an aerodynamic and aesthetic wheel and permits the assembly to adapt to measurements standardized by international regulations which govern this art. Also the modified tire is intended to decrease friction with the inner wheel, determine a guided movement on it and decrease rotating displacement with reference to the tire rim when running under the run flat condition.

IV—DETAILED DESCRIPTION OF THE INVENTION

Figure 1:
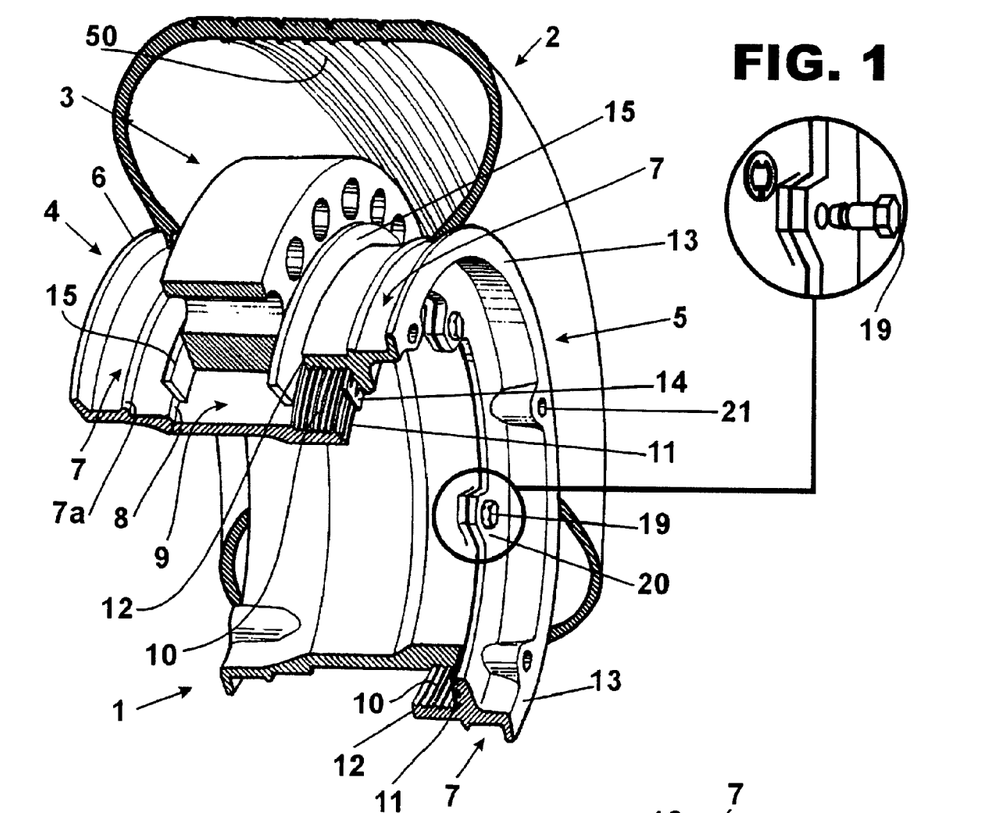
FIG. 1 is a perspective view of the demountable tire rim assembly having a tire mounted thereon and spare inner wheel in accordance with the present invention.
Figure 2:
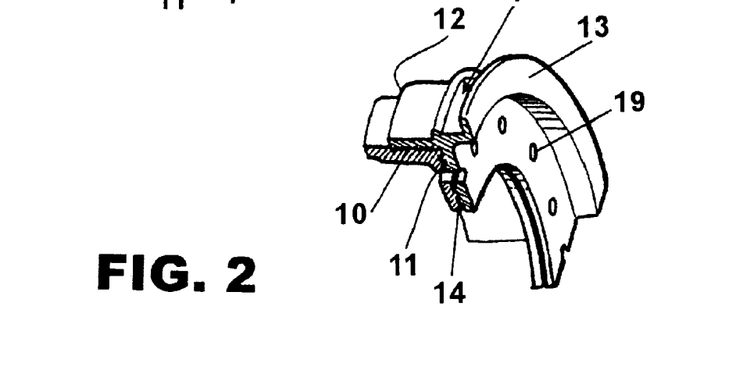
FIG. 2 is a enlarged perspective view of the demountable rim assembly in accordance with the present invention.

As it can be observed in FIGS. 1 and 2, the present invention is related to a demountable tire rim assembly (1) having a spare inner wheel (3) which is integrated by two complementary annular parts (4)(5) having threaded reciprocal coupling means (10).

The body of the demountable tire rim (1) comprises two complementary annular parts (4)(5) which consist of a first part (4) and a second part (5). Both complementary annular parts (4) (5) are provided with side holding rims (6) (13) for the tire (2).

Figure 7:
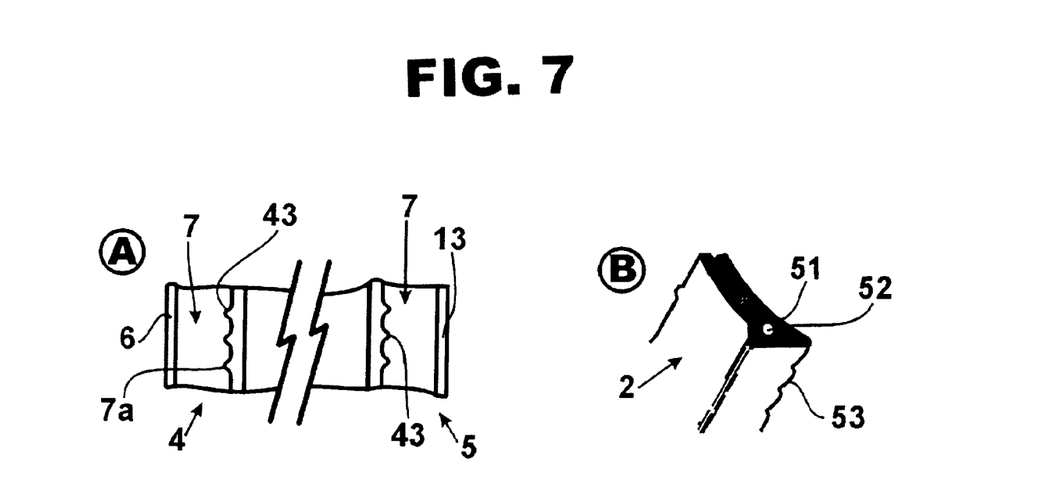
FIG. 7A is a top-view of the annular parts members in accordance with the present invention.
FIG. 7B is a perspective view of a tire bead in accordance with the present invention.
Figure 8:
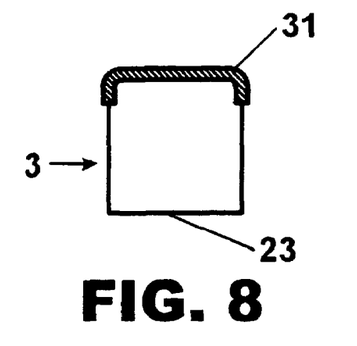
FIGS. 8-10 are cross-sectional views of the spare inner wheel in accordance with the present invention.
Figure 9:
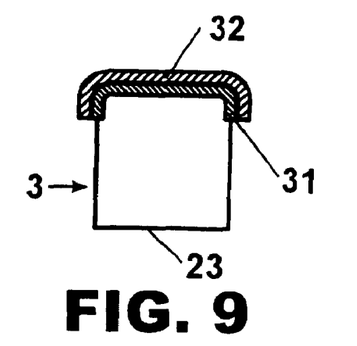
Figure 10:
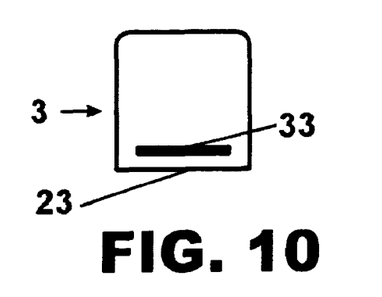

According to FIG. 7A, between the holding rim (6) or (13) and an adjacent rim (7a), a wedge is formed (7) for the tire (2) bead (51). The possibility that the adjacent rim (7a) has gearing means (43) with similar means (53) provided by the tire (2) bead (51) has been provided. This allows an integral assembly between the tire rim (1) and the tire (2) (See FIG. 7b). FIG. 7A illustrates a plurality of recesses and ledges 43 which are regularly spaced and extend around the outer perimeter of the annular parts 4, 5, next to the side rims 6, 13, to limit rotation of the tire 2 on the tire rim assembly when running under the run flat condition.

Figure 11:
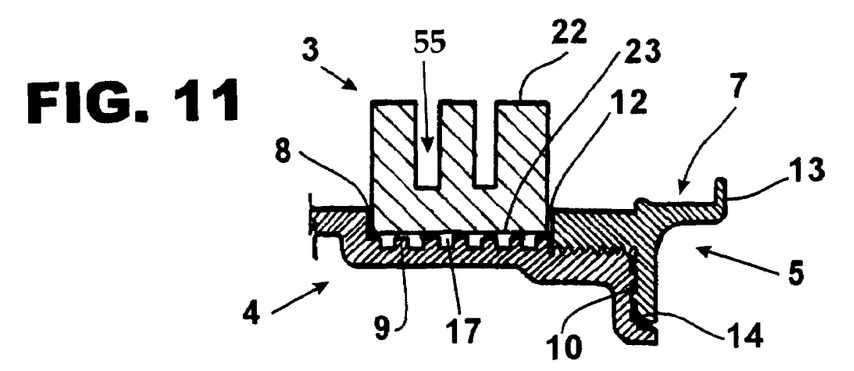
FIGS. 11-14 are cross-sectional views of the spare inner wheel mounted to the annular parts in accordance with the present invention.
Figure 12:
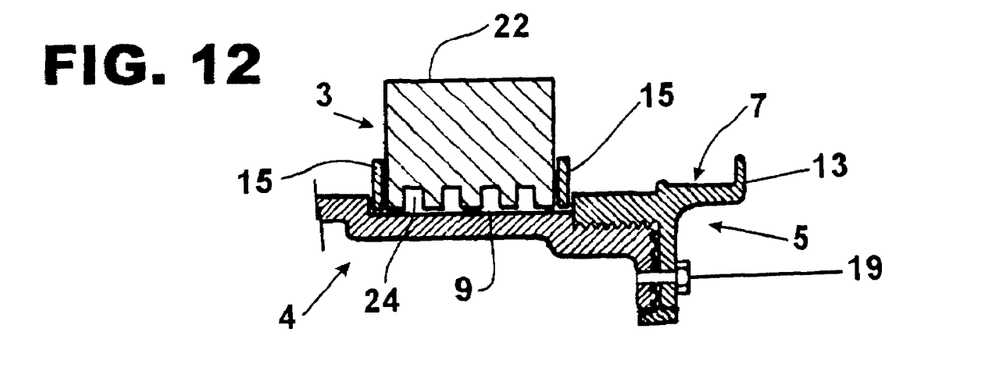

In the central part of the tire rim assembly (1) there are assembly means for one or more spare wheels (3). The assembly means includes a central depression (9) that may be even or grooved (17) (FIG. 11) and which is limited by side edges (8) (12) of annular parts 4,5 and by central rims (15) (FIG. 3) which are supported against the side edges (8) (12). When there are two or more spare wheels (3), a separating rim (16) can be added (16). (See FIGS. 1, 2, 3, 4, 5, 6, 12 and 14).

Figure 25:
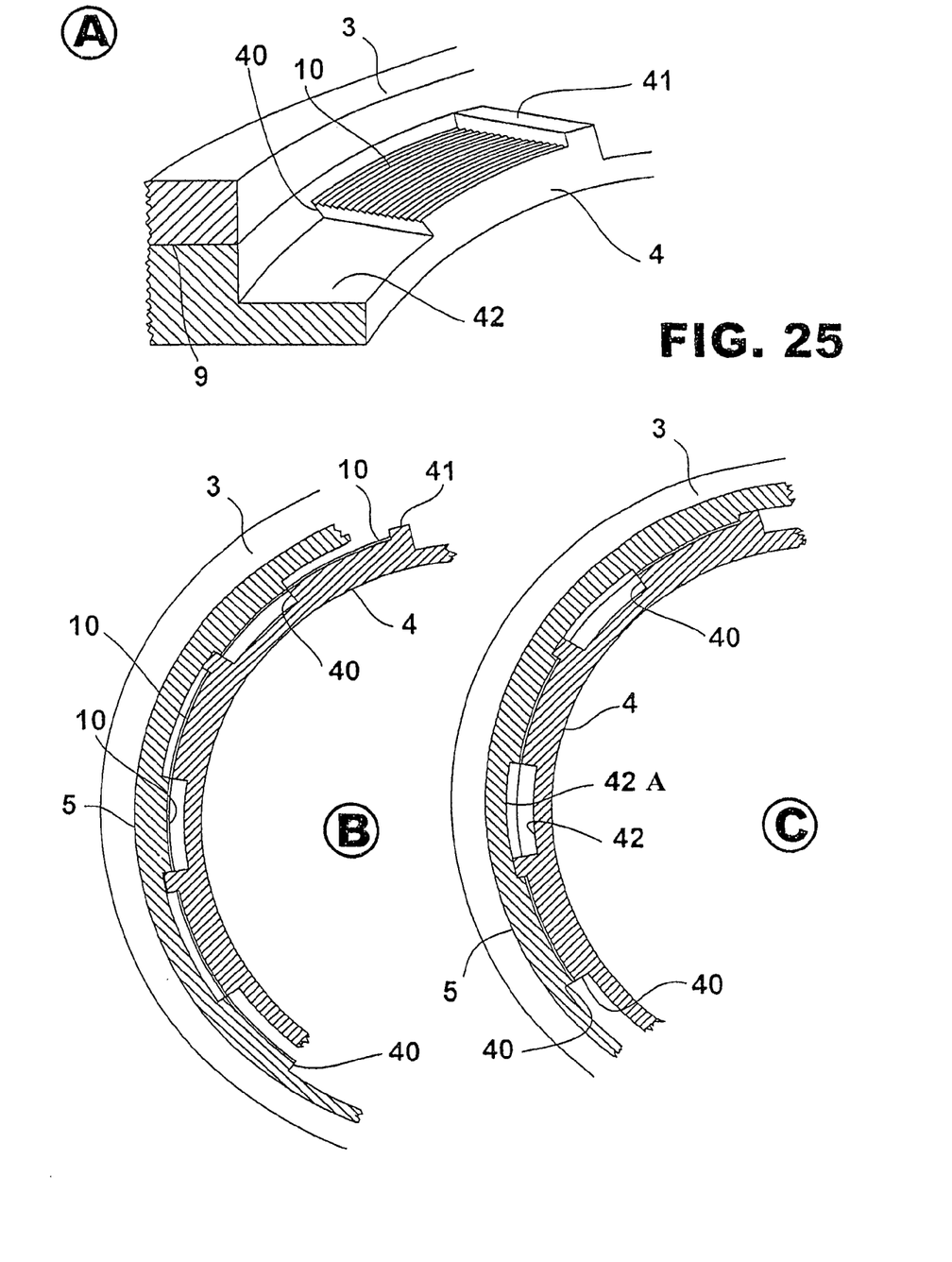
FIG. 25A is a perspective view of the threaded sectors on the perimeter of the annular parts in accordance with the present invention.
FIGS. 25B and 25C are cross-views showing the locking movement of the annular parts in accordance with the present invention.

The two complementary annular parts (4) (5) have reciprocal coupling means or threads (10). (See FIGS. 1, 2 and 25A-C). In one case, the reciprocal coupling means may each consist of continuous threads (10) formed at the above mentioned complementary annular parts (4) (5). In another case, the reciprocal coupling means consists of a plurality of threaded sectors (40) on the edge of the whole perimeter of both adjacent segments of the tire rim (1) which have, on one of their ends, an elevated part as a stop (41), inserted with sectors (42 and 42A) without a thread, with the surface of sector (42) at a lower level and the surface of sector 42A is at a higher level in relation to the threaded sectors (40). The different sectors, 40, 42 and 42A have the same width so that they can be inserted to one another, to be fixed together by means of threading rotating movements between the annular parts. (See FIGS. 25A, 25B and 25C).

The reciprocal coupling means are complemented by means of interconnection and fixation means (19) of the complementary annular parts (4)(5). These interconnection and fixation means (19) include a plurality of equal and equally-spacedly openings distributed on flanges 20 placed on the perimeter of both edges, which, one opposite the other, form passages for fixation screws or for bolts with lockpin washer (See detail in FIG. 1 and FIG. 2).

In FIGS. 1, 4, 5 and 6, it can be seen that both complementary annular parts (4)(5) define a joint area (11) that may be even or with annular ledges. The annular ledges can be facing or insertable. In this joint area, there is an elastomeric joint (14) that may also be even or with annular ledges.

Figure 13:
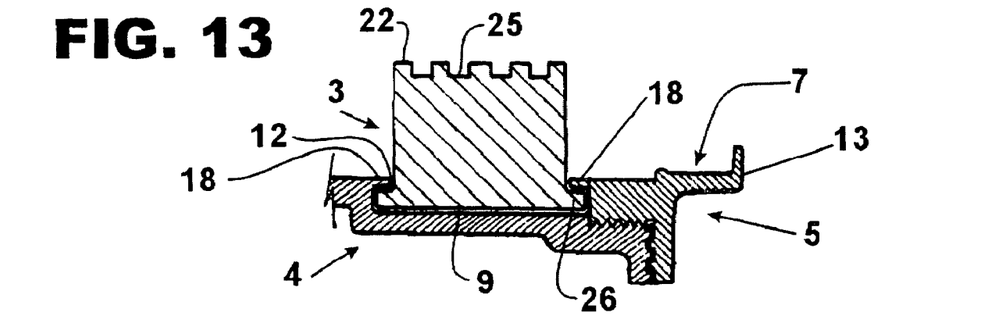
Figure 14:
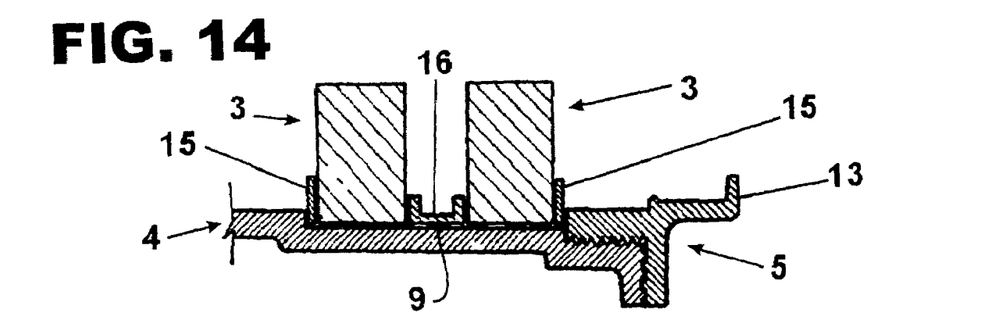
Figure 15:
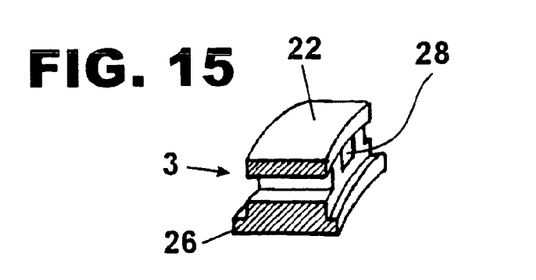
FIGS. 15-21 are perspective views of the spare inner wheel in accordance with the present invention.
Figure 16:
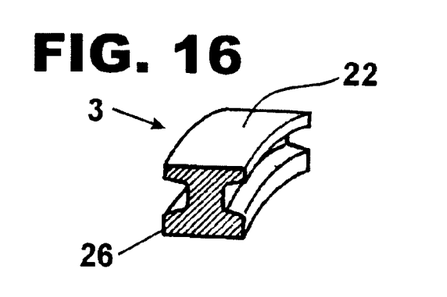
Figure 17:
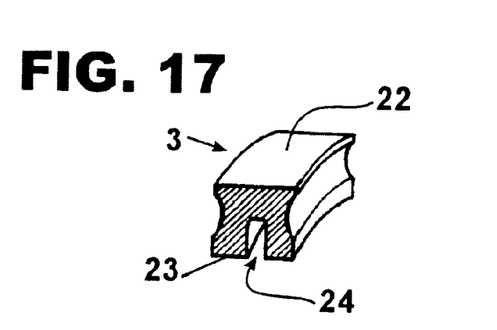
Figure 18:
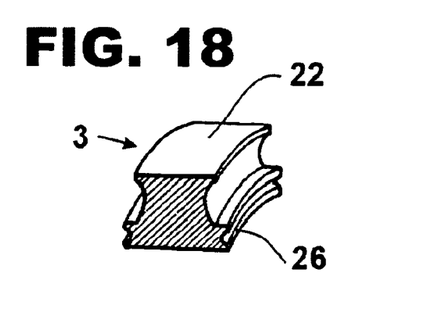
Figures 19, 20, 21:
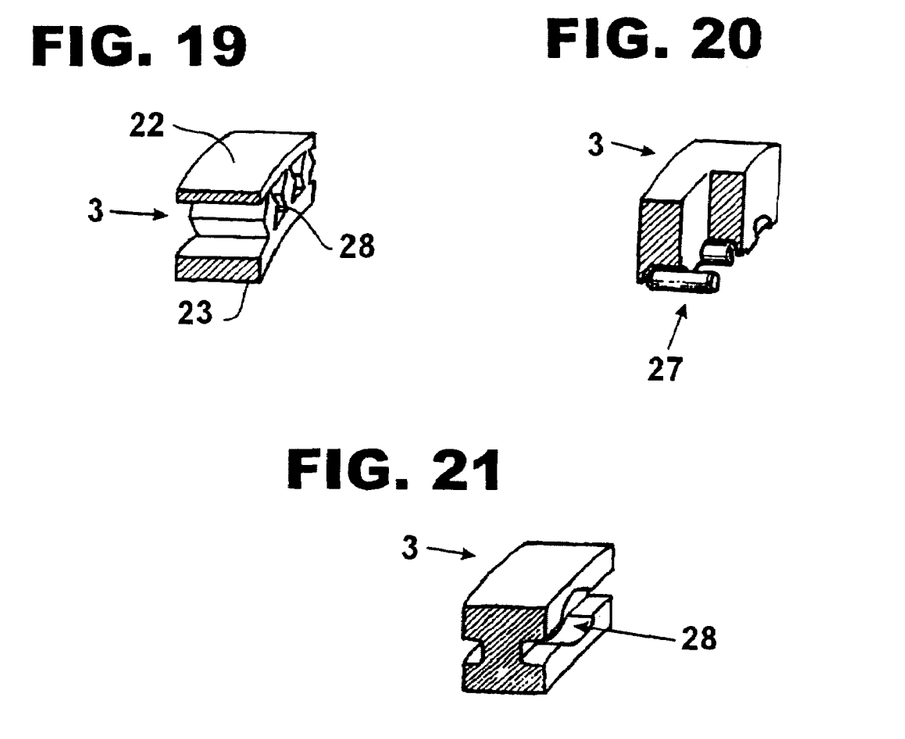
Figure 22:
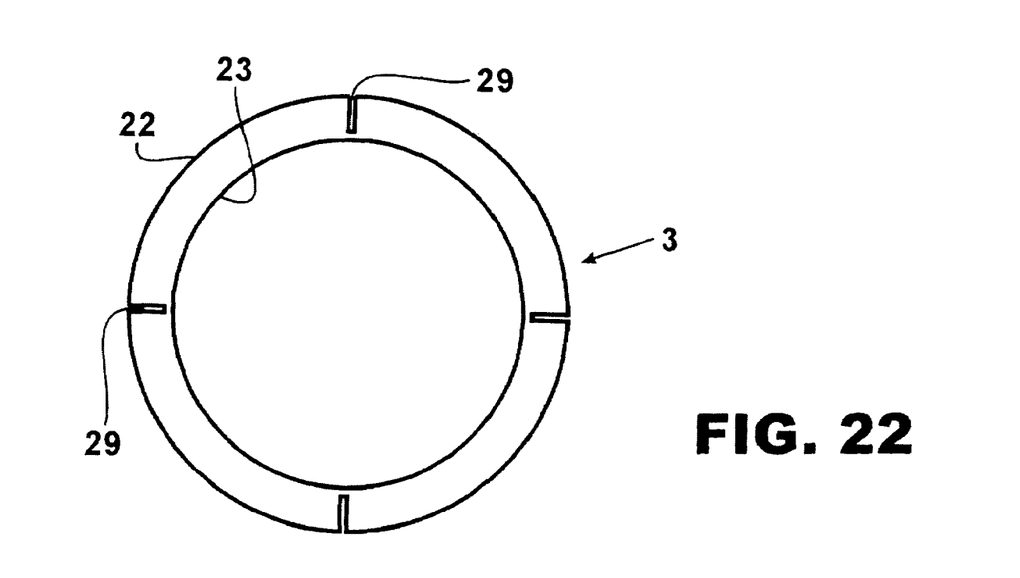
FIGS. 22-24 are side views of various embodiments of the spare inner wheel in accordance with the present invention.
Figure 23:
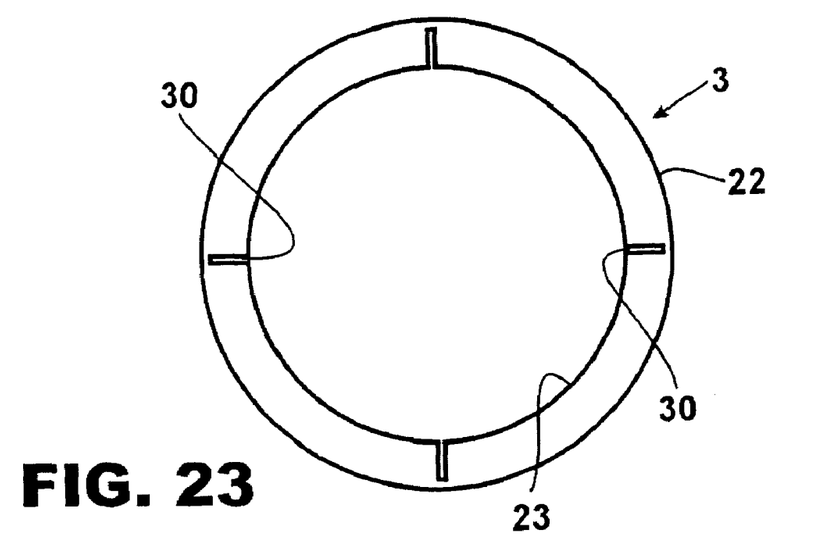
Figure 24:
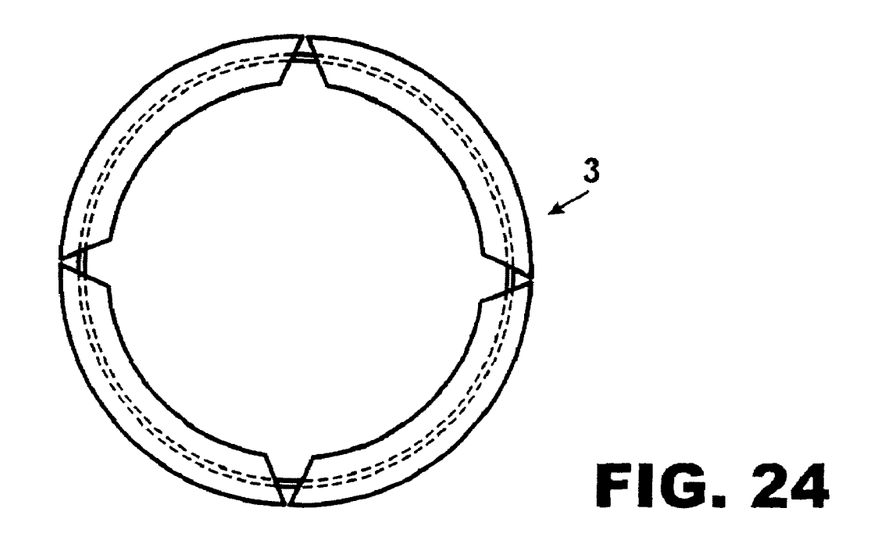

Concerning the spare wheel (3), it can be grooved (55) (24)(25) or even (22) in one-piece, one-piece with recesses (29) on the even periphery (22), one-piece with recesses (30) on the inner edge (23) or either comprised by sectors related to an annular member which goes through theme as shown in FIGS. 8-13 and 15-19. FIG. 13 illustrates the side retention member 18 on the annular parts 4,5 which is engageable with the annular projection member 26 extending axially from the spare inner wheel 3. FIG. 19 illustrates roller bearings 27 which may be inserted between the spare inner wheel 3 and the annular depression.

Different examples of spare wheels (3) are illustrated in FIGS. 7, 8, 9, 10, 11, 12, 13, 14, 15, 16, 17, 18, 19, 20, 21, 22, 23 and 24.

Figure 3:
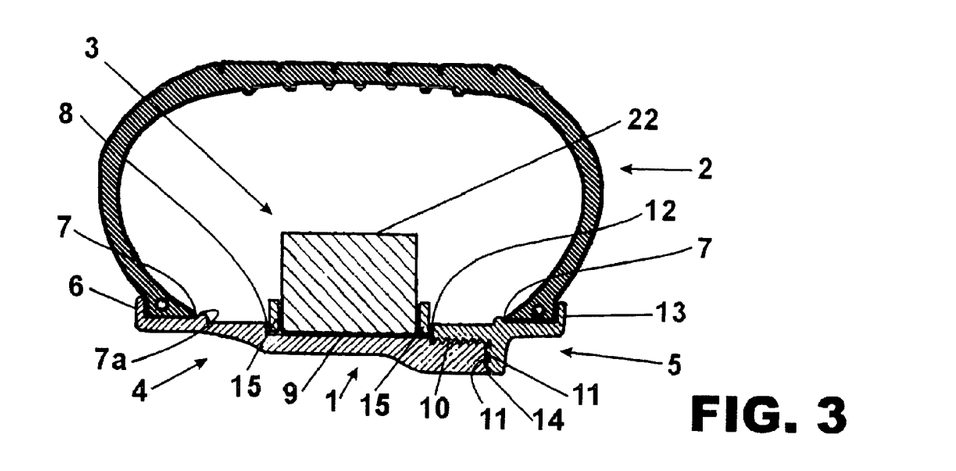
FIG. 3 is a cross-sectional view of the demountable rim assembly in accordance with the present invention.
Figure 4:
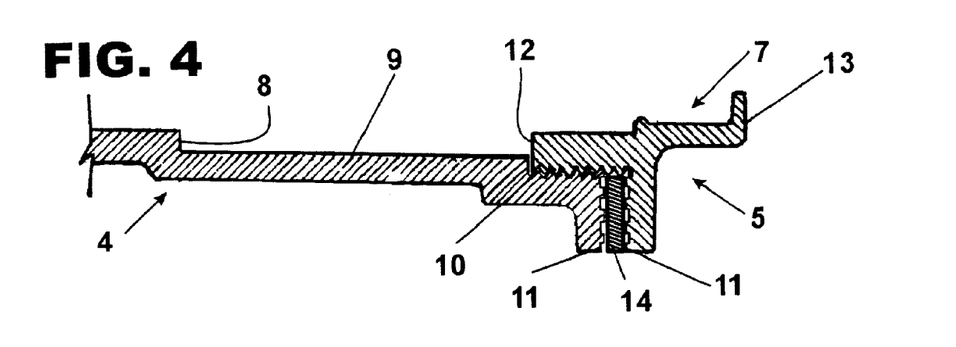
FIGS. 4-6 are cross-section views of the annular parts members in accordance with the present invention.
Figure 5:
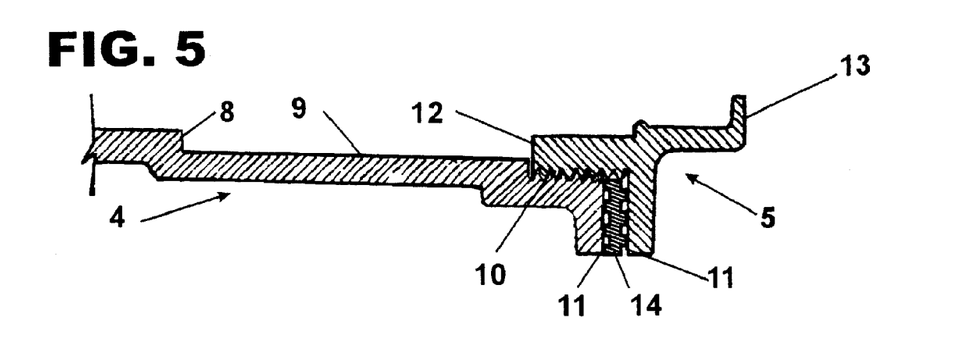
Figure 6:
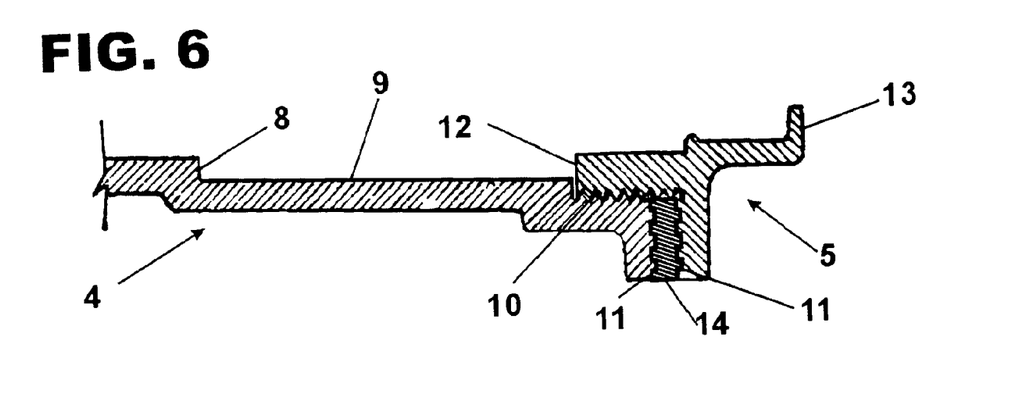

With regard to the tire, in addition to the gearing means (53), the tire possesses a reinforcement annular member (52) arranged within the bead (51) (See FIGS. 3 and 7B).

In FIGS. 1 and 2, some inner ledges (50) of the above mentioned tire (2) can be seen to face and facilitate contact with the spare wheel (3) under the run flat tire condition.

It is evident that when the present invention is put into practice, modifications may be made regarding certain construction and shape details, without departing from the basic principles which are clearly encompassed in the following claims.

What is claimed is:

1. A demountable rim assembly for use with a vehicle having a spare inner wheel associated therewith and adapted to receive a tire having an inner surface thereon for engagement with the inner surface of the tire, including in combination:

a rim body comprised of at least two complementary annular parts of which both annular parts provide side holding rims structurally arranged to engage the tire mounted thereon;

said at least two complementary annular parts being provided with reciprocal coupling means structurally arranged therebetween to permit engagement of said complementary annular parts to one another to provide support for the spare inner wheel and to permit engagement of the spare inner wheel with the inner surface of the tire when in the run flat condition; and wherein said reciprocal coupling means includes a plurality of threaded sectors on the edge of the perimeter of said annular parts of the rim assembly, with one of said annular parts having an elevated stop member associated with said threaded sectors and a recessed non-threaded sector associated with said threaded sectors, with said threaded and non-threaded sectors having the same width, such that when said complementary annular parts are inserted one into the other a threaded rotating movement therebetween fixes one to the other.

2. The demountable rim assembly, in accordance with claim 1, wherein the spare inner wheel has a diameter greater than the diameter of said holding rims.

3. The demountable rim assembly in accordance with claim 1, wherein said reciprocal coupling means include interconnection and fixation members to secure said annular parts to one another.

4. The demountable rim assembly in accordance with claim 3, wherein said annular parts include flanges thereon having a plurality of aligned openings in said flanges and said interconnection and fixation members include screw members.

5. The demountable rim assembly in accordance with claim 4, wherein said interconnection and fixation members include bolt members.

6. The demountable rim assembly in accordance with claim 1, wherein said complimentary annular parts provide an annular depression having side edges defined by said annular parts for receiving the spare inner wheel.

7. The demountable rim assembly in accordance with claim 6, wherein said annular depression includes a reduced friction surface for receiving the spare inner wheel.

8. The demountable rim assembly in accordance with claim 6, wherein said holding rim members are positioned against said side edges for receiving the spare inner wheel.

9. The demountable rim assembly in accordance with claim 8, wherein each of said annular parts include an annular side detention member engageable with the spare inner wheel.

10. The demountable rim assembly in accordance with claim 9, wherein the spare inner wheel includes an annular projection member which is structurally arranged to be received by said annular side retention members.

11. The demountable rim assembly in accordance with claim 6, wherein bearing members are positioned between the inner wheel member and said annular depression.

12. The demountable rim assembly in accordance with claim 1, wherein adjacent said side holding rims said annular parts include a plurality of recesses and ledges thereon which engage the tire mounted thereon to restrict rotation of the tire during the run flat condition.

13. The demountable rim assembly in accordance with claim 12, wherein the tire includes a bead portion having a plurality of recesses and ledges therearound which cooperate with said recess and ledges on said annular parts to restrict rotation of the tire during the run flat condition.

14. The demountable rim assembly in accordance with claim 1, wherein said fixed complementary annular parts define a joint area therebetween.

15. The demountable rim assembly in accordance with claim 14, wherein said joint area defined by said annular parts include sidewalls having a uniform annular facing thereon.

16. The demountable rim assembly in accordance with claim 14, wherein said joint area defined by said annular parts include sidewalls having concentric annular ledges thereon.

17. The demountable rim assembly in accordance with claim 14, wherein said joint area includes an elastomeric material positioned therein.

18. The demountable rim assembly in accordance with claim 14, wherein said elastomeric material includes sidewalls having concentric annular ledges thereon.

19. The demountable rim assembly in accordance with claim 14, wherein said elastomeric material includes sidewalls having a uniform facing thereon.

* * * * *